(12) United States Patent
Farrell et al.

(10) Patent No.: US 8,190,437 B2
(45) Date of Patent: May 29, 2012

(54) SPEAKER VERIFICATION METHODS AND APPARATUS

(75) Inventors: Kevin R. Farrell, Medford, MA (US); David A. James, Cambridge (GB); William F. Ganong, III, Brookline, MA (US); Jerry K. Carter, Somerville, MA (US)

(73) Assignee: Nuance Communications, Inc., Burlington, MA (US)

( * ) Notice: Subject to any disclaimer, the term of this patent is extended or adjusted under 35 U.S.C. 154(b) by 760 days.

(21) Appl. No.: 12/258,150

(22) Filed: Oct. 24, 2008

(65) Prior Publication Data
US 2010/0106503 A1     Apr. 29, 2010

(51) Int. Cl.
*G10L 21/00* (2006.01)
(52) U.S. Cl. .......................................... 704/273; 704/246
(58) Field of Classification Search .......... 704/246–250, 704/273–274
See application file for complete search history.

(56) References Cited

U.S. PATENT DOCUMENTS

| | | | | |
|---|---|---|---|---|
| 5,548,647 | A * | 8/1996 | Naik et al. | 704/200 |
| 6,539,352 | B1 * | 3/2003 | Sharma et al. | 704/249 |
| 6,574,596 | B2 * | 6/2003 | Bi et al. | 704/249 |
| 6,789,063 | B1 * | 9/2004 | Yan | 704/250 |
| 7,409,343 | B2 * | 8/2008 | Charlet | 704/246 |
| 7,437,289 | B2 * | 10/2008 | Chaudhari et al. | 704/244 |
| 7,970,614 | B2 * | 6/2011 | Kim et al. | 704/256.2 |
| 2003/0036904 | A1 * | 2/2003 | Chaudhari et al. | 704/250 |
| 2004/0117183 | A1 * | 6/2004 | Deligne et al. | 704/248 |
| 2004/0162726 | A1 * | 8/2004 | Chang | 704/247 |
| 2004/0225498 | A1 * | 11/2004 | Rifkin | 704/250 |
| 2006/0136207 | A1 * | 6/2006 | Kim et al. | 704/249 |
| 2007/0198264 | A1 * | 8/2007 | Chang | 704/250 |
| 2008/0172230 | A1 * | 7/2008 | Hayakawa | 704/249 |
| 2008/0195389 | A1 * | 8/2008 | Zhang et al. | 704/246 |
| 2008/0312926 | A1 * | 12/2008 | Vair et al. | 704/249 |
| 2009/0187404 | A1 * | 7/2009 | Yoma | 704/246 |
| 2009/0259470 | A1 * | 10/2009 | Chang | 704/246 |

FOREIGN PATENT DOCUMENTS

EP     0 856 836 A2     8/1998
(Continued)

OTHER PUBLICATIONS

International Search Report and Written Opinion for International application No. PCT/US2009/005770 mailed Jan. 19, 2010.

(Continued)

*Primary Examiner* — Douglas Godbold
(74) *Attorney, Agent, or Firm* — Wolf, Greenfield & Sacks, P.C.

(57) ABSTRACT

In one aspect, a method for determining a validity of an identity asserted by a speaker using a voice print is provided. The method comprises acts of performing a first verification stage comprising comparing a first voice signal from the speaker uttering at least one first challenge utterance with at least a portion of the voice print and performing a second verification stage if it is concluded in the first verification stage that the first voice signal was obtained from an utterance by the user. The second verification stage comprises adapting at least one parameter of the voice print based, at least in part, on the first voice signal to obtain an adapted voice print, and comparing a second voice signal from the speaker uttering at least one second challenge utterance with at least a portion of the adapted voice print.

39 Claims, 6 Drawing Sheets

FOREIGN PATENT DOCUMENTS

EP     1 164 576 A1     12/2001

OTHER PUBLICATIONS

Furui, S., "Recent advances in speaker recognition," *Pattern Recognition Letters*, Sep. 1, 1997, pp. 859-872, vol. 18, No. 9, Elsevier, Amsterdam, NL.

Ward, N. C. et al., "Text-independent speaker identification and verification using the timit database," Oct. 1, 1998, 4 pages.
International Search Report and Written Opinion for International application No. PCT/US2009/005771 mailed Jan. 28, 2010.

* cited by examiner

SPEAKER VERIFICATION METHODS AND APPARATUS

FIELD OF THE INVENTION

The present invention relates to speaker verification, and more particularly, to methods and apparatus for enhancing security and/or accuracy of speaker verification.

BACKGROUND

Speaker verification is a speech technology employed in a variety of applications that require or benefit from protection against fraudulent or unauthorized access to information and/or secure areas. For example, speaker verification systems may be used to verify the identity of a speaker prior to authorizing the speaker to access sensitive or confidential information and/or to enter a secure area of a building or other locale to which access is limited to authorized personnel. The financial services industry, for example, may benefit from speaker verification as a means to provide security in their online or telephone banking systems to replace or supplement convention security schemes such as password protections.

Systems that employ speaker verification typically attempt to verify the claimed identity of a speaker undergoing verification by matching the voice of the speaker with a "voice print" obtained from a person whose identity the speaker is claiming. A voice print refers to any type of model that captures one or more identifying characteristics of a person's voice. Typically, a voice print is obtained at the time a speaker verification system enrolls a user by prompting the user to utter a particular enrollment utterance or utterances to obtain a voice signal from the user. The enrollment utterance may be comprised of one or more words selected by the system, for example, due to the presence of a variety of vowel, nasal or other sounds in the words that tend to carry information specific to the speaker. The voice signal obtained from the user may then be analyzed to extract characteristic features of the voice signal to form, at least in part, a voice print that models the speech of the enrolled user.

Prior to granting access, the speaker verification system may prompt a speaker undergoing verification to utter a challenge utterance to obtain a voice signal to be matched with the voice print of the enrolled user whose identity the speaker is asserting. The term "challenge utterance" refers to one or more words that a speaker verification system prompts a speaker undergoing verification to utter so that the voice characteristics of the speaker can be compared with voice characteristics of the enrolled user (e.g., as modeled by the associated voice print). Based on the similarity between the characteristic features in the voice signal obtained from the speaker and the voice print obtained at enrollment, the speaker verification system can either accept or reject the asserted identity of the speaker.

Speaker verification may have significant security advantages over conventional security measures such as passwords, personal identification numbers (PINS), etc. For example, a person's voice may be uniquely tied to the speaker's identity and therefore less susceptible to being obtained via theft and less vulnerable to being discovered by hackers. Despite the security enhancements that speaker verification affords, however, state of the art digital recorders are capable of recording a speaker's voice with enough fidelity to trick conventional speaker verification systems using a technique known as a playback attack.

Perpetrators of playback attacks have devised various schemes to elicit one or more utterances from an enrolled user that includes the challenge words for the speaker verification system being attacked. The perpetrator secretly records the utterance(s) and plays back the recording in response to a challenge from the speaker verification system to trick the system into believing that the enrolled user is present and uttering the challenge words. Thus, playback attacks may present a substantial security risk to institutions employing conventional speaker verification systems. Some conventional speaker verification systems have attempted to thwart playback attacks by prompting the user to speak a series of random digits. However, these efforts may not be entirely effective and such conventional systems are still susceptible to playback attacks.

The accuracy of a speaker verification system may be affected by a number of factors that cause voice signals obtained at enrollment to differ from those obtained during a challenge/response session, even when the voice signals are produced by the same speaker. For example, over time, the characteristics of a person's vocal tract age resulting in changes in the sound of the person's voice. Thus, voice aging may cause false negatives to occur because a person's voice has aged sufficiently such that it's characteristics no longer closely match the voice print obtained during enrollment. Other changes that may reduce the accuracy of speaker verification include voice changes brought about by illness (e.g., cold, congestion or chronic illness), differences in the handsets used during enrollment and any subsequent challenge/response session (e.g., differences in cell phone versus land line), ambient noise present during the challenge and response sessions, etc.

Adaptation is a process of updating a voice print over time using voice information obtained from a speaker at one or more times subsequent to enrollment to model any voice changes that might have occurred. For example, a speaker verification system may, from time to time, use a voice signal obtained during a challenge/response session of a speaker that is subsequently verified by the system to incorporate characteristic features of the aged or changed voice into the model (i.e., into the voice print). Such adaptation techniques may allow a voice print to evolve over time to maintain satisfactory recognition accuracy even in the face of changes in the person's voice.

SUMMARY OF THE INVENTION

Some embodiments include a method for determining validity of an identity asserted by a speaker using a voice print associated with a user whose identity the speaker is asserting, the voice print obtained from characteristic features of at least one first voice signal obtained from the user uttering at least one enrollment utterance including at least one enrollment word, the is method comprising acts of obtaining a second voice signal of the speaker uttering at least one challenge utterance, wherein the at least one challenge utterance includes at least one word that was not in the at least one enrollment utterance, obtaining at least one characteristic feature from the second voice signal, comparing the at least one characteristic feature with at least a portion of the voice print to determine a similarity between the at least one characteristic feature and the at least a portion of the voice print, and determining whether the speaker is the user based, at least in part, on the similarity between the at least one characteristic feature and the at least a portion of the voice print.

Some embodiments include a computer readable medium encoded with at least one program for execution on at least one processor, the program having instructions that, when executed on the at least one processor, perform a method of determining a validity of an identity asserted by a speaker using a voice print associated with a user whose identity the speaker is asserting, the voice print obtained from characteristic features of at least one first voice signal obtained from the user uttering at least one enrollment utterance including at least one enrollment word, the method comprising acts of obtaining a second voice signal of the speaker uttering at least one challenge utterance, wherein the at least one challenge utterance includes at least one word that was not in the at least one enrollment utterance, obtaining at least one characteristic feature from the second voice signal, comparing the at least one characteristic feature with at least a portion of the voice print to determine a similarity between the at least one characteristic feature and the at least a portion of the voice print, and determining whether the speaker is the user based, at least in part, on the similarity between the at least one characteristic feature and the at least a portion of the voice print.

Some embodiments include a speaker verification system comprising at least one computer readable storage medium storing at least one voice print, each obtained from characteristic features of at least one first voice signal obtained from a user uttering at least one enrollment utterance, a transmitter to provide a prompt to a speaker undergoing verification to utter at least one challenge utterance having at least one word that was not in the at least one enrollment utterance, a receiver to receive at least one second voice signal of the speaker responding to the prompt, and at least one controller coupled to the memory, transmitter and receiver, the at least one controller configured to obtain at least one characteristic feature from the second voice signal, compare the at least one characteristic feature with at least a portion of the at least one voice print obtained from the user whose identity the speaker is asserting to determine a similarity between the at least one characteristic feature and the portion of the at least one voice print, and determine whether the speaker is the user based, at least in part, on the similarity between the at least one characteristic feature and the at least a portion of the at least one voice print.

Some embodiments include a method for determining a validity of an identity asserted by a speaker using a voice print that models speech of a user whose identity the speaker is asserting, the method comprising acts of performing a first verification stage comprising acts of obtaining a first voice signal from the speaker uttering at least one first challenge utterance; and comparing at least one characteristic feature of the first voice signal with at least a portion of the voice print to assess whether the at least one characteristic feature of the first voice signal is similar enough to the at least a portion of the voice print to conclude that the first voice signal was obtained from an utterance by the user. The method further comprises performing a second verification stage if it is concluded in the first verification stage that the first voice signal was obtained from an utterance by the user, the second verification stage comprising acts of adapting at least one parameter of the voice print based, at least in part, on the first voice signal to obtain an adapted voice print, obtaining a second voice signal from the speaker uttering at least one second challenge utterance, and comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user.

Some embodiments include a computer readable medium encoded with at least one program for execution on at least one processor, the program having instructions that, when executed on the at least one processor, perform a method for determining a validity of an identity asserted by a speaker using a voice print that models speech of a user whose identity the speaker is asserting, the method comprising acts of performing a first verification stage comprising acts of obtaining a first voice signal from the speaker uttering at least one first challenge utterance, and comparing at least one characteristic feature of the first voice signal with at least a portion of the voice print to assess whether the at least one characteristic feature of the first voice signal is similar enough to the at least a portion of the voice print to conclude that the first voice signal was obtained from an utterance by the user. The methods further comprises performing a second verification stage if it is concluded in the first verification stage that the first voice signal was obtained from an utterance by the user, the second verification stage comprising acts of adapting at least one parameter of the voice print based, at least in part, on the first voice signal to obtain an adapted voice print, obtaining a second voice signal from the speaker uttering at least one second challenge utterance, and comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user.

Some embodiments include a speaker verification system comprising at least one computer readable storage medium storing at least one voice print, the at least one voice print obtained from characteristic features of at least one first voice signal obtained from a user uttering at least one enrollment utterance a receiver to receive voice signals of speakers being verified responding to prompts to utter one or more challenge utterances, and at least one controller coupled to the at least one computer readable storage medium and the receiver. The at least one controller configured to perform a first verification stage comprising obtaining from the receiver a first voice signal from a speaker who is being verified, the first voice signal obtained from the speaker uttering at least one first challenge utterance, and comparing at least one characteristic feature of the first voice signal with at least a portion of a first voice print of the at least one voice print obtained from the user whose identity the speaker is asserting to assess whether the at least one characteristic feature of the first voice signal is similar enough to the at least a portion of the first voice print to conclude that the first voice signal was obtained from an utterance by the user. The at least one controller is further configured to perform a second verification stage if it is concluded in the first verification stage that the first voice signal was obtained from an utterance by the user the at least one controller, the second verification stage comprising adapting at least one parameter of the first voice print based, at least in part, on the first voice signal to obtain an adapted voice print, obtaining from the receiver a second voice signal from the speaker uttering at least one second challenge utterance, and comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user.

DETAILED DESCRIPTION

Figure 1:
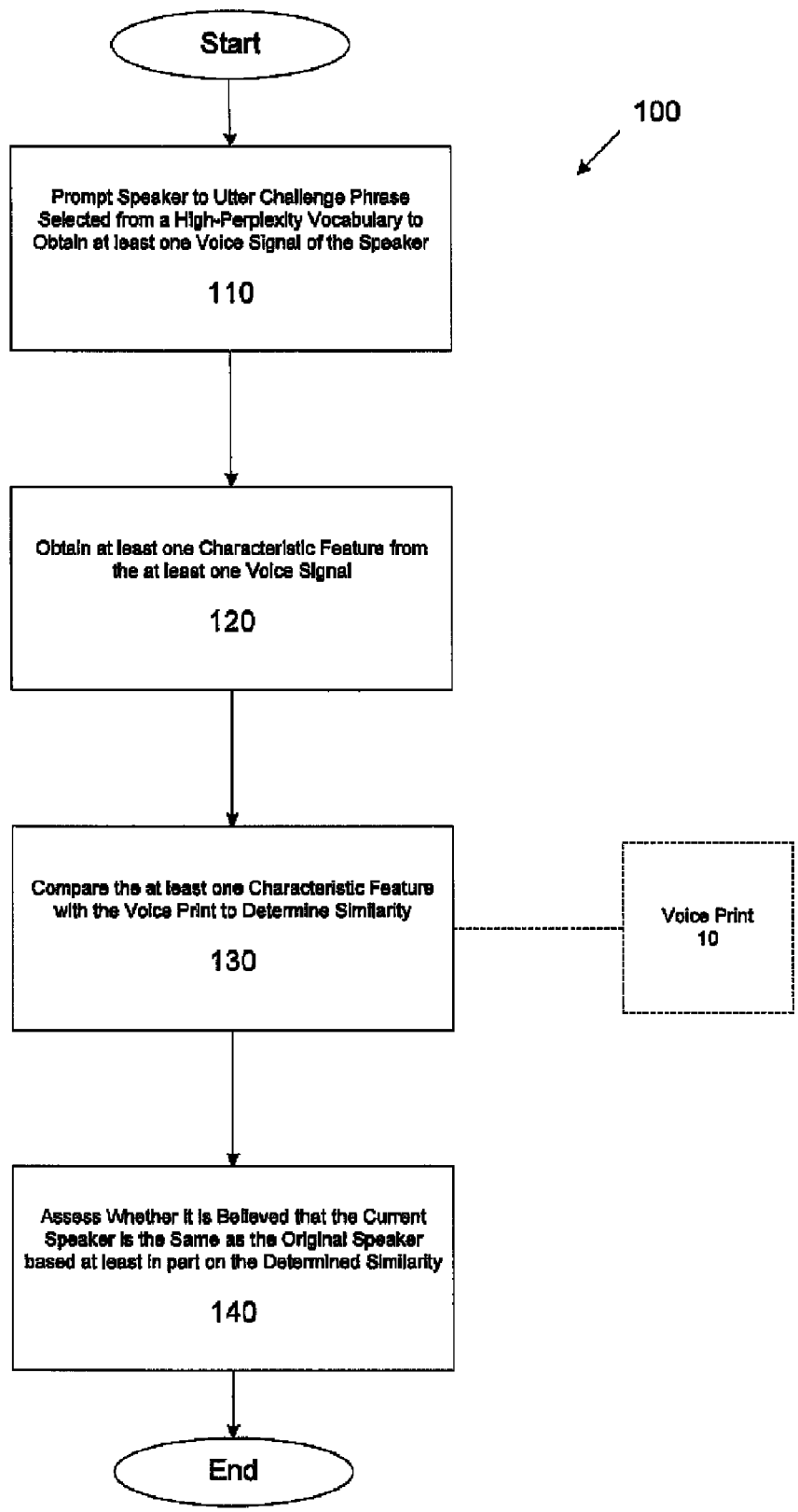
FIG. 1 is a flow chart illustrating a method of performing speaker verification, in accordance with some embodiments of the present invention.

As discussed above, conventional speaker verification systems may be vulnerable to playback attacks. Conventional approaches to preventing playback attacks such as the randomization technique discussed above may fail when recordings of the user are spliced together by a perpetrator of a playback attack. Applicant has recognized that this vulnerability may result, in part, due to the relatively simplistic vocabulary from which conventional systems select their challenge utterances. In particular, many conventional speaker verification systems select the words for the enrollment utterance and the words for the challenge utterance from the same vocabulary. For example, conventional systems may use a vocabulary that consists of the digits 0-9 from which both enrollment and challenge utterances are selected.

For example, during enrollment, a user may be prompted to utter the digits 0-9, perhaps multiple times, to obtain the voice signals from which the user's identifying voice print is obtained. Alternatively, a user may be prompted to utter his/her account number, telephone number, or the like in order to enroll with the system. Similarly, the challenge/response scheme used by many conventional speaker verification systems may include selecting a random sequence of digits between 0-9 as the challenge utterance that the speaker undergoing verification is prompted to utter. As discussed above, the voice signals obtained from the user to form the voice print is typically obtained when a user enrolls with the speaker verification system. However, the voice signals may be obtained at other times. Accordingly, the term "enrollment utterance" and "enrollment vocabulary" are used to describe the utterances and words forming those utterances, respectively, from which the voice print is derived, whenever obtained.

Verification accuracy tends to increase when the enrollment words and the challenge words are the same, and even more so if repeated in the same order. Therefore, using the same vocabulary increases accuracy. However, Applicant has appreciated that this conventional approach of sharing a vocabulary for enrollment and challenge utterances allows for the possibility of successful playback attacks. In the example provided above, a perpetrator may be able to readily elicit an utterance from a target user speaking the digits 0-9 without raising the target user's suspicion that deceptive or fraudulent activity is occurring.

For example, a method that may be used by perpetrators of playback attacks involves sending an e-mail or voicemail to a target user asserting that suspicious activity has been detected on a credit card or bank card possessed by the target user, and providing a number for the target user to call to either verify the suspicious activity as valid or confirm that the transaction was fraudulent. When the target user calls in, the perpetrator may prompt the individual to provide numeric information to prove that the target user is the possessor of the flagged credit or bank card. For example, the perpetrator may request that the target user speak his or her credit card number, birth date, social security number or other identifying numeric information such that the perpetrator can obtain a voice sample of the target user uttering as many of the challenge words (e.g., the digits 0-9) as possible. The perpetrator may later replay, or splice and replay, the recorded samples of the target user uttering the challenge words in response to a challenge from the speaker verification system.

Applicant has recognized several factors related to the vocabulary from which enrollment and challenge words are selected that render conventional speaker verification systems vulnerable to playback attacks. As discussed above, when the challenge utterance is selected from the same vocabulary as the enrollment utterance, perpetrators of a playback attack may be able to readily determine what words will be used in a challenge utterance and are therefore better equipped to obtain voice samples of the same. In addition, the relatively simplistic vocabulary utilized by many conventional speaker verification systems enables perpetrators to elicit responses from a target user to obtain such voice samples of the words in the vocabulary without raising suspicion. Also, the relatively limited vocabulary conventionally used (e.g., the ten words that form the digits 0-9) provides the opportunity for perpetrators to obtain recorded samples from a target user of the entire vocabulary.

Applicant has recognized that by providing a high-perplexity vocabulary, perpetrators may be prevented from successfully defeating a speaker verification system, particularly with respect to playback attacks. A high-perplexity vocabulary may include any one or combination of features that decrease the likelihood of success of a playback attack, including, but not limited to, challenge words that are selected from a different vocabulary then the enrollment words, challenge words that are relatively conspicuous so as to be difficult to obtain by a perpetrator without alerting a target user to the possibility of deceitful or fraudulent activity, and/or challenge words selected from a relatively large vocabulary to reduce the likelihood that a perpetrator can obtain voice samples of the entire vocabulary. It should be appreciated that a high-perplexity vocabulary may include further features that render it more difficult to defeat a speaker verification system, as the aspects of the invention are not limited in this respect.

As discussed above, adaptation may be used to update a voice print in association with the evolution of a speaker's voice over time. Conventional speaker verification systems have used adaptation techniques to update a voice print to maintain accuracy only in subsequent or future challenge/response sessions. In particular, new voice information obtained from a verified user may be used to adapt the voice print to improve the accuracy of future sessions in which a speaker interacts with the speaker verification system.

Applicant has appreciated that adaptation techniques may be used in a single session to assist in increasing the accuracy of a multiple stage verification process and/or to compensate for factors such as handset differences, temporary illness, ambient noise and/or other contemporaneous factors that may cause changes in obtained voice signals. In some embodiments, the voice signal obtained from a speaker is analyzed and compared with a stored voice print to determine whether the speaker should be allowed to proceed to one or more additional verification stages. If the initial verification is successful, the voice print may be adapted to incorporate characteristic features of the voice signals obtained in the current challenge/response session. The updated voice print may then be used for further verification steps.

By using adaptation techniques in a single session, not only may differences attributed to the aging of the speaker be accounted for, but changes resulting from the specific circumstances of a given utterance may also be accounted for, such as changes in the type of handset used, temporary illness of the speaker, ambient noise, etc. In some embodiments, a multi-stage verification process may include one or more stages that attempt to optimize accuracy and one or more stages directed to preventing playback attacks. For example, in one non-limiting example, a first stage can be performed that uses challenge words selected from the enrollment words to increase the likelihood of a match despite any of the above-described factors that may influence voice recognition accuracy, and then a second stage can be performed that uses challenge words different from the enrollment words, but wherein adaptation techniques can be employed to compensate for factors that may influence voice recognition accuracy.

Following below are more detailed descriptions of various concepts related to, and embodiments of, methods and apparatus according to the present invention. It should be appreciated that various aspects of the invention described herein may be implemented in any of numerous ways. Examples of specific implementations are provided herein for illustrative purposes only. In addition, the various aspects of the invention described in the embodiments below may be used alone or in any combination, and are not limited to the combinations explicitly described herein.

FIG. 1 is flow chart illustrating a method of performing speaker verification, in accordance with some embodiments of the present invention. Method 100 may be used, for example, in connection with a voice print 10 that was previously obtained when a user enrolled with the system, for example, by having the user utter one or more enrollment words or utterances. The voice signal obtained from having the user utter the enrollment utterance may then have been analyzed to extract one or more characteristic features that form, at least in part, voice print 10. Voice print 10 may have been based on characteristic features that include any one or combination of voice formants, pitch characteristics or any other feature related to voiced or nasal sounds that are indicative of an individual's speech.

Any such characteristic features obtained from the voice signal may be used to form, at least in part, a voice print that models the speech of the enrolled user. Any number and type of characteristic features may be extracted that assist in developing a voice print capable of identifying a speaker at accuracy levels satisfactory for the corresponding application in which it is used, as the aspects of the invention are not limited in this respect. There are many techniques for modeling speech, any of which may be suitable for obtaining a voice print for each user enrolled by the speaker verification system.

As discussed above, voice print 10 may be obtained by first having a user, at enrollment, utter a number of words or utterances in a given vocabulary (i.e., to utter an enrollment utterance selected from an enrollment vocabulary). To obtain voice signals that contain sufficient differentiating characteristic features, the enrollment utterance may include words that are representative of the variety of voiced and nasal sounds in human speech (e.g., words that contain a variety of the vowel sounds). A common enrollment vocabulary from which the enrollment words or utterances are selected includes the digits 0-9. In particular, prompting the enrolling user to speak the digits 0-9, perhaps multiple times, is typically sufficient for generating a voice signal having speaker specific and/or speaker unique characteristics that can be used to form a voice print suitable for differentiating the user's voice pattern from other speakers. Such an enrollment vocabulary can be used in some embodiments of the invention, although others are possible.

As discussed above, conventional speaker verification systems proceed by prompting speakers undergoing verification to utter challenge words that are selected from the same vocabulary as the enrollment utterance (i.e., from the enrollment vocabulary). However, using challenge words identical to those used during enrollment in a challenge/response session may render the system vulnerable to playback attacks. Thus, in accordance with one embodiment, to reduce the likelihood of successful playback attacks, a speaker undergoing verification is prompted to utter a challenge utterance formed from one or more words selected from a high-perplexity vocabulary to obtain at least one voice signal of the speaker (act 110). By using a high-perplexity vocabulary from which challenge utterances are selected, it may be more difficult or impossible for an impostor to defeat the speaker verification system using playback attacks.

As discussed above, a high-perplexity vocabulary may include one or any combination of features that facilitate implementing a challenge/response scheme resistant to playback attacks. In some embodiments, act 110 includes prompting the speaker to utter a challenge utterance that includes at least one word not used during enrollment. In some embodiments, the challenge utterance consists preponderantly, substantially or entirely of words not used during enrollment (e.g., the vocabulary from which challenge words are selected may include all different words than the vocabulary from which the enrollment words were selected), but it should be appreciated that the aspect of the invention related to the use of at least one different challenge word is not limited in this respect, as few as a single different challenge word may be employed.

In accordance with one embodiment, the high-perplexity vocabulary from which challenge words are selected has relatively substantial phonetic overlap with the enrollment words to facilitate satisfactory recognition accuracy of the speaker verification system. In particular, if the phonetic overlap is insufficient, the voice signal obtained from the challenge utterance may not have appropriate content to generate characteristic features suitable for the speaker verification system to accurately ascertain whether a match has been made.

In some embodiments, the high-perplexity vocabulary from which the challenge utterance is selected may be comprised of words that are different from the words used during enrollment, but include a variety of the same voiced sounds, such as vowel and nasal sounds, as the words used for the enrollment utterance (e.g., the high-perplexity vocabulary may include words that each has one or more syllables that rhyme with one or more syllables of an enrollment word). For example, when the enrollment words or utterances are selected from an enrollment vocabulary including the digits 0-9, the challenge vocabulary may comprise words that have the same vowel sounds, e.g., words that have a syllable that rhymes with one or more vowel sounds present in the digits 0-9.

For example, the digits 0-9 (or some subset of the digits 0-9) may be included in the enrollment vocabulary, and proper names having phonetic overlap with the digits may be included in the challenge vocabulary (i.e., the high-perplexity vocabulary). Table 1 below illustrates an example of an enrollment vocabulary including the digits 1-9 and examples of proper names with phonetic overlap that may be included in the high-perplexity vocabulary from which challenge utterances may be selected, in accordance with some embodiments of the present invention.

TABLE 1

| Enrollment Vocabulary | Challenge Vocabulary |
|---|---|
| One | Hunter, Munson, Dunlop . . . |
| Two | Lou, Truman, Drew, Sue, Susie . . . |
| Three | Lee, Peter, Reed . . . |
| Four | Ford, Gordon, Forman . . . |
| Five | Clive, Ivory, Isaac . . . |
| Six | Trixie, Nixon, Dixie . . . |
| Seven | Evan, Devon, Kevin, Evelyn . . . |
| Eight | Nate, Tate, Kate, Bates, Gates . . . |
| Nine | Stein, Klein, Devine . . . |

It should be appreciated that the above enrollment and challenge vocabularies are merely exemplary and any two vocabularies that differ, and preferably have relatively significant phonetic overlap, may be used, as the aspects of the invention are not limited to using digits as the enrollment vocabulary, to using names as the challenge vocabulary, or in any other respect. In some embodiments, the one or more syllables in the challenge words that share voiced phonemes (e.g., rhyme or share nasal sounds) with the enrollment words are the emphasized syllables. In particular, Applicant has appreciated that accuracy may be improved by selecting challenge words that emphasize the phonetic overlap. However, this is not a limitation on this aspect of the invention, as phonetic overlap may occur in emphasized or non-emphasized syllables (or both).

It should be further appreciated that the number of words in each vocabulary are also not limited by the examples shown herein and may be selected to suit any particular application. For example, the high-perplexity vocabulary may be expanded to include any number of challenge words. Likewise, the enrollment vocabulary can include any type and number of enrollment words. As discussed below in some embodiments, it is desirable to employ a relatively large number of challenge words to reduce the likelihood of a perpetrator being able to capture voice samples of the entire challenge vocabulary.

One example of a challenge/response session (e.g., one example of performing act 110) using the vocabularies illustrated in Table 1 proceeds as follows. A speaker verification system may challenge a speaker undergoing verification by prompting the speaker to utter a given first, middle and last name. For example, the speaker verification system may prompt the speaker to utter the name "Lee Truman Nixon", which has substantial phonetic overlap (e.g., overlap of voiced phonemes such as shared vowel and/or nasal sounds) with a number of digit sequences including 3-2-6, 3-1-1, 3-2-1-6-1, etc. Thus, the speaker verification system may obtain voice signals having enough overlap in the voiced sounds characterizing the enrollment vocabulary that the characteristic features of the voice signal obtained from the challenge utterance are sufficient to accurately determine whether there is a match between the voice of the speaker and the voice of the enrolled user from which voice print 10 (FIG. 1) was obtained.

The vocabularies illustrated in Table 1 may have a number of advantages including the fact that using proper names as the challenge words may reduce the chances of a speaker misunderstanding the prompt and unintentionally uttering the incorrect words. In addition, using the digits 1-9 as the enrollment vocabulary may allow for easy update of legacy systems that used the same vocabulary because users would not have to re-enroll to obtain a new voice print. This benefit would, of course, apply to all circumstances wherein the enrollment vocabulary remains unchanged from any legacy system, regardless of whether the legacy enrollment vocabulary was formed from digits or from other enrollment words. However, it should be appreciated that any challenge vocabulary that differs from the enrollment vocabulary may be used, as the aspect of the invention that relates to using a different challenge vocabulary is not limited in this respect. For example, Tables 2 and 3 illustrate additional examples of suitable enrollment vocabularies and high-perplexity vocabularies from which challenge utterances may be selected.

TABLE 2

| Enrollment Vocabulary | Challenge Vocabulary |
|---|---|
| One | London, Sunland, Boston, . . . |
| Two | New York, Tuscon, Tewksbury . . . |
| Three | Rio, East Timor, Riyadh, Tremont . . . |
| Four | Fort Dix, Fordham, Portland . . . |
| Five | Rodeo Drive, Ivory Coast . . . |
| Six | Dixieland, Fort Dix . . . |
| Seven | Leavenworth, Heaven's Gate . . . |
| Eight | Bering Strait, Heaven's Gate, United States . . . |
| Nine | Rhineland, The Rhine . . . |

The use of place names as a high-perplexity vocabulary may provide benefits including conspicuous words having substantial phonetic overlap with the enrollment vocabulary that can be almost limitless in number. However, to extend a high-perplexity vocabulary, other challenge words may be used. For example, in Table 3 below, the long vowel sounds are used as the enrollment vocabulary (e.g., a user may be prompted to speak the words "A-E-I-O-U", perhaps in repetition, during enrollment) and verbs with phonetic overlap are used to form the high-perplexity vocabulary.

TABLE 3

| Enrollment Vocabulary | Challenge Vocabulary |
|---|---|
| A | play, say, pray, lay . . . |
| E | see, plea, agree, freeze, . . . |
| I | fry, deny, apply, sigh . . . |
| O | go, grow, tow, flow, show . . . |
| U | do, pursue, glue, sue . . . |

It should be appreciated that the enrollment and challenge vocabularies need not include related words. For example, the challenge vocabulary may include a variety of subjects, verbs and objects such that simple sentences may be used as the challenge utterance. Alternatively, the high-perplexity vocabulary may include unrelated words that are selected randomly (or otherwise) to produce nonsensical utterances having sufficient phonetic overlap with the enrollment words. Any collection of words that are not part of the enrollment vocabulary may be suitable to form a high-perplexity vocabulary from which challenge words may be selected. In addition, the exemplary challenge words shown above can instead be used as enrollment words provided the challenge words are then selected from a different vocabulary, as the aspects of the invention are not limited in this respect.

In some embodiments, another aspect that may contribute to a high-perplexity vocabulary includes the nature of the words themselves. For example, a perpetrator of a playback attack may readily elicit a response from a target user including the digits 0-9 without raising the suspicion of the target user. This may be due, in part, to people's familiarity with being prompted to speak numeric identifying information (e.g., credit card numbers and/or other numeric identifiers such as birth date, social security number, etc.) As a result, the perpetrator may record the utterances without the speaker being alerted to the fact that suspicious activity is being undertaken. Accordingly, in some embodiments, the high-perplexity vocabulary is comprised of relatively conspicuous words that are more likely to trigger suspicion from a target user should the target user be prompted to utter such words by a perpetrator of a playback attack.

Applicant has appreciated that using proper names to form the high-perplexity vocabulary may have this advantage as well. In particular, a speaker may be more readily alerted to suspicious activity if prompted to utter a series of proper names as opposed to a series of digits. It should be appreciated, though, that while proper names may be particularly suited to alerting a speaker of suspicious activity, any set of words that would raise suspicion may be used (e.g., the names of places and verbs illustrated in the high-perplexity vocabularies shown in Tables 2 and 3, respectively), as the aspects of the invention are not limited in this respect.

In some embodiments, another element of a high-perplexity vocabulary includes the number of words in the vocabulary from which a challenge utterance may be selected. The digits 0-9 form a relatively simple vocabulary that, if used as the challenge vocabulary, may permit a perpetrator of a playback attack to obtain voice recordings of each word in the challenge vocabulary. Having obtained each word in the challenge vocabulary, the perpetrator can respond correctly to any challenge from the speaker verification system by playing back the appropriate recorded voice samples. Accordingly, by expanding the challenge vocabulary to include an increased number of words, the perplexity of the challenge vocabulary may be likewise increased, making it more difficult for a perpetrator to obtain a voice recording of each word in the challenge vocabulary. Therefore, a perpetrator may be incapable of responding correctly to challenges from the speaker verification system due to the high number of challenge utterances that can be constructed from the expanded vocabulary.

Applicant has appreciated that because a high-perplexity vocabulary may include different words than the enrollment vocabulary, almost any number of challenge words can be selected for each vowel sound and/or voiced or nasal sounds characterizing the words in the enrollment vocabulary. Thus, the number of words forming a high-perplexity vocabulary can be increased up to any practical limit. For example, in Table 1 above, a plurality of challenge words for each of the vowel sounds of the digits 1 through 9 are shown. However, it should be appreciated that the number of challenge words may be increased or reduced, and that any number of challenge words may be selected to cover the vowel sounds of a particular enrollment vocabulary, as the aspect of the invention that employs challenge words that differ from the enrollment words is not limited in this respect.

In some embodiments, the number of challenge words in the high-perplexity vocabulary is greater than 25, in others greater than 50, in others greater than 75 and in others is 100 or more. The greater the number of challenge words that are available in the high-perplexity vocabulary, the more a perpetrator's efforts to obtain each word in the vocabulary may be frustrated. However, any number of challenge words may be used, as all aspects of the invention are not limited to using a large number of challenge words.

As discussed above, a high-perplexity vocabulary may include any one or combination of high-perplexity factors including using challenge utterances that include words not used during enrollment, using relatively conspicuous challenge words that, when prompted, more readily raise suspicion, and/or a relatively large collection of challenge words from which to select a challenge utterance. In some embodiments, a high-perplexity vocabulary having each of the above-identified factors of high-perplexity may be used. However, each high-perplexity factor need not be present in every high-perplexity vocabulary, as any one can be used alone or any two or more in combination.

Returning to the method of FIG. 1, in act 120, the voice signal obtained from the speaker undergoing verification is analyzed to obtain at least one characteristic feature. The one or more characteristic features obtained from the voice signal may be the same characteristic features that were extracted from the voice signal obtained from the user during enrollment to form, at least in part, voice print 10. As discussed above, verifying the identity of a speaker may involve comparing the characteristic features of the speaker's voice with the characteristic features of the enrolled user's voice. Accordingly, in some embodiments, the same characteristic features extracted from the voice signal obtained during enrollment are extracted from the voice signal obtained in act 110 to provide for account verification.

In act 130, the characteristic feature(s) obtained from the voice signal of the speaker uttering the challenge utterance is compared with the voice print of the enrolled user whose identity the speaker is asserting (e.g., voice print 10). The comparison may be performed in any number of ways that result in one or more values or measures indicative of the similarity between the obtained characteristic feature(s) and the voice print, some examples of which are described in further detail below. In act 140, it is assessed whether the obtained voice characteristics are similar enough to the voice print to conclude that the speaker and the enrolled user are the same person. If so, the speaker's identity may be verified and access granted. Otherwise, the speaker may be denied access by the speaker verification system. Accordingly, method 100 may be resistant to successful playback attacks.

Figure 2:
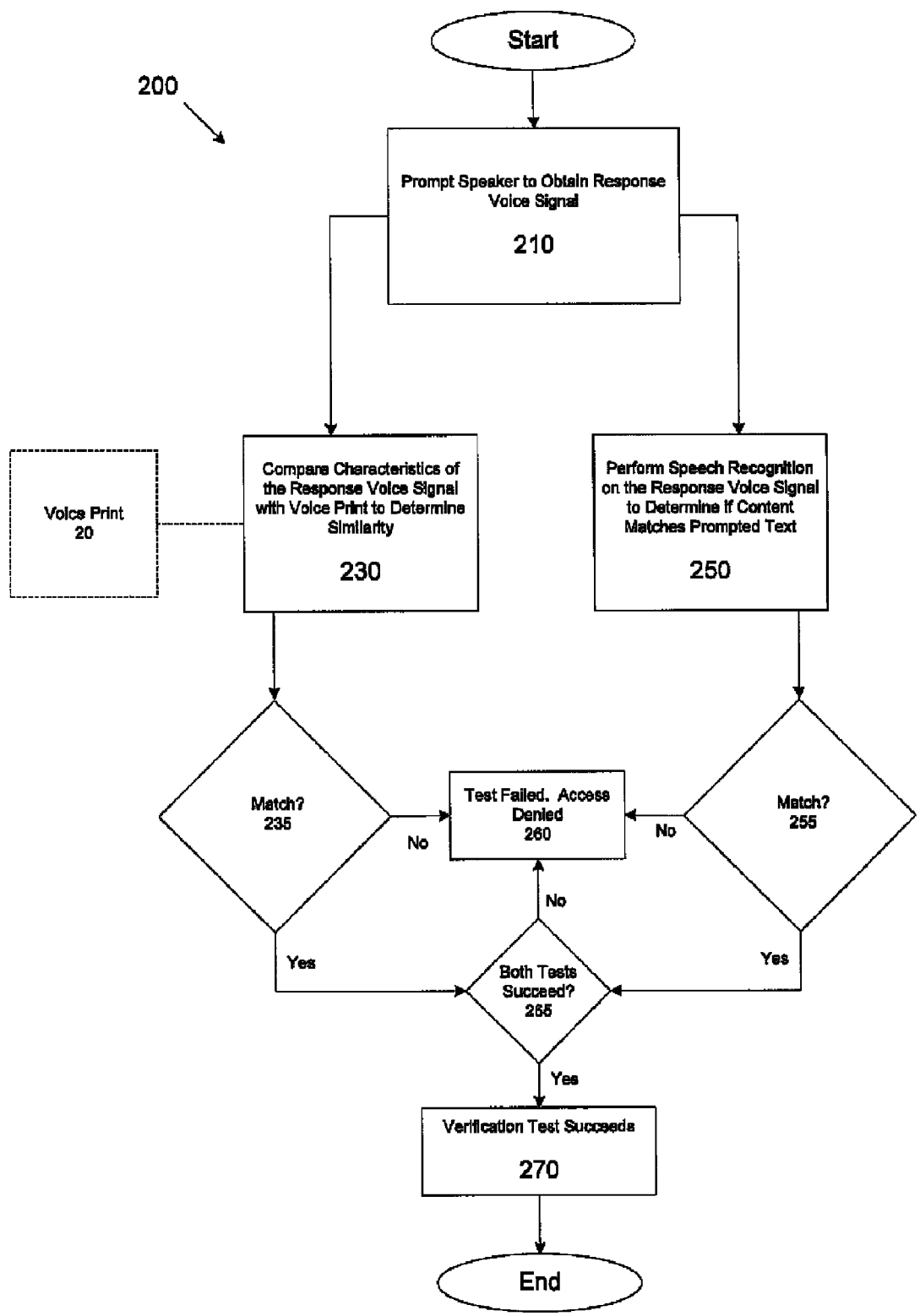
FIG. 2 is a flow chart illustrating a method of performing speaker verification including speech recognition to accommodate using a high-perplexity vocabulary, in accordance with some embodiments of the present invention.

FIG. 2 is a flow chart illustrating an alternate method of verifying the identify of a speaker, in accordance with some embodiments of the present invention. As discussed above, one feature of a high-perplexity vocabulary is the use of challenge words that were not used during enrollment. Applicants have appreciated that if a speaker verification system only verifies that the response to a challenge is a match to a stored voice print, a perpetrator may be able to trick the system by playing back recorded samples obtained from the enrolled user speaking the enrollment words, even if they differ from the challenge words. In this respect, as discussed above, the enrollment vocabulary may be smaller and/or simpler than the challenge vocabulary and easier for a perpetrator to obtain actual recordings of the user speaking the words in the enrollment vocabulary. Accordingly, in some embodiments, speaker verification may include a speech recognition stage that ensures that the words uttered in response to a challenge utterance match the true challenge utterance prompted by the speaker verification system, in addition to a voice verification stage that ensures that the voice pattern of the speaker matches that of the expected voice print for the user.

Speech recognition refers to any of various techniques used to convert spoken language into machine readable words. For example, speech recognition may include any of various techniques that analyze an input voice signal to identify the individual words that form the voice signal. Many speech recognition techniques are known. Any speech recognition technique capable of identifying language in a voice signal and obtaining machine understandable words from the voice signal may be used for determining whether a response from a speaker matches the words prompted in a challenge utterance, as the aspects of the invention are not limited in this respect.

In act 210, a speaker undergoing verification may be prompted to speak a challenge utterance to which the speaker responds to produce a response voice signal. The response voice signal may then be analyzed to determine whether characteristic features of the response voice signal match the voice characteristics of an enrolled user as modeled by voice print 20, and to determine whether the speaker spoke the correct challenge utterance. These verifications can be performed in any order or (as shown in FIG. 2) in parallel. For example, in act 230, characteristic features extracted from the response voice signal may be compared with the stored voice print 20 to assess their similarity. In one embodiment, the comparison may include one or more comparisons that result in a score indicative of the similarity between the characteristic features of the response voice signal and the stored voice print. If the score indicates sufficient similarity, the speaker verification may determine (act 235) that there is a match and the response utterance uttered by the speaker is considered to have come from the enrolled user.

In addition, verification 200 may also verify that the response utterance uttered by the speaker matches the words comprising the challenge utterance. For example, in act 250, the response voice signal may be analyzed to recognize the actual words forming the response voice signal. As discussed above, any speech recognition technology that is capable of identifying words in a voice signal may be used. The words recognized in the response voice signal may then be compared (act 255) to the challenge words issued by the voice verification system. If the words match, then the speaker may be considered to have responded correctly to the challenge.

In some embodiments, if either the speaker verification test or the speech recognition test fails, the speaker may be denied access by the voice verification system (act 260). That is, if the speaker verification test fails, the speaker may be denied access under the suspicion that the speaker is a human imposter and not the same person as the enrolled user. If the speech recognition test fails, the speaker may be denied access under suspicion that a playback attack is being perpetrated. Accordingly, in some embodiments, both the speaker verification and speech recognition tests must succeed before the identity of the speaker is verified and the speaker is granted access (acts 265, 270). By performing both speaker verification and speech recognition, perpetrators of playback attacks may be prevented from succeeding using voice samples of the enrollment words when they differ from the challenge words. It should be appreciated that the specific verification steps described above are merely exemplary and do not limit the invention in any way. For example, the above verification test may be included in a multi-stage verification process, as discussed in further detail below.

Figure 3A:
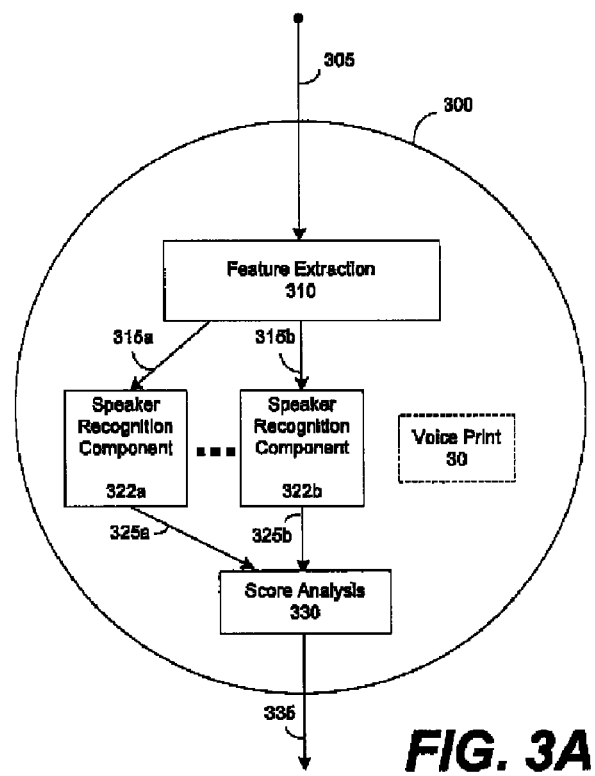
FIGS. 3A and 3B illustrate a speaker verification method that may be used in connection with some embodiments of the present invention.
Figure 3B:
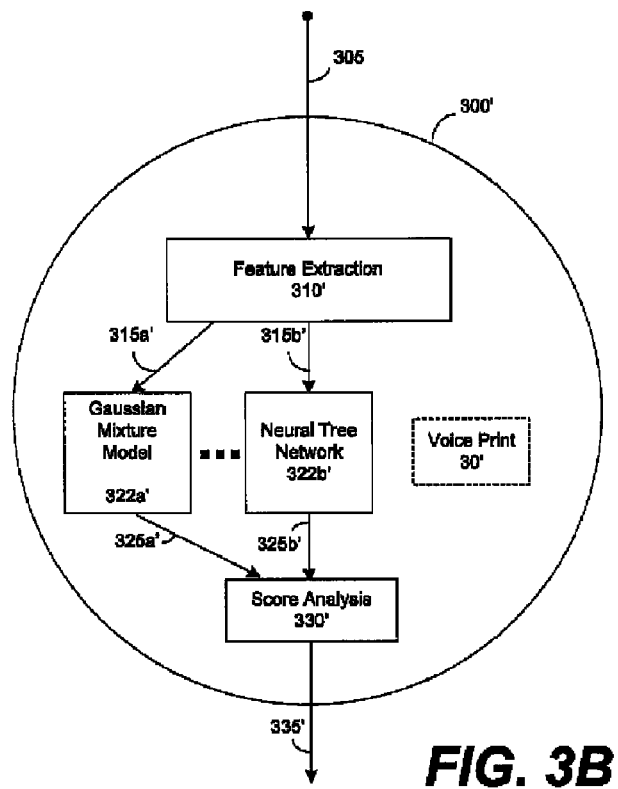

FIGS. 3A and 3B illustrate a speaker verification method that may be used in connection with any of the aspects of the invention. As discussed above, any suitable technique may be used for modeling voice to develop a voice print and comparing characteristic features of an obtained voice signal with the voice print to verify the identity of a speaker. A non-limiting example of some techniques are discussed below in connection with FIGS. 3A and 3B.

Speaker verification 300 illustrated in FIG. 3A includes a feature extraction component 310, which receives a voice signal 305. For example, voice signal 305 may be a response voice signal obtained by prompting a speaker to utter a challenge utterance. Feature extraction component 310 analyzes voice signal 305 and obtains one or more characteristic features from the voice signal. The extracted features may be any property or characteristic of the voice signal that tends to be specific to individual speakers. For example, any one or combination of voice formants, pitch, prosidy, spectral slope, timing, timbre, stress, etc., and/or how any one or combination of such features transition over time may be extracted from the voice signal 305. Feature extraction component 310 generates one or more feature vectors 315 based on the features extracted from the voice signal. The type and number of features extracted from the voice signal may depend on the specifics of the techniques being used to match a speaker's voice with a stored voice print. However, it should be appreciated that any feature or set of features may be extracted from voice signal 305 to assist in verifying the identity of the speaker.

Speaker verification 300 also includes one or more speaker recognition components 322. Each of the speaker recognition components 322 may compare feature vectors received from feature extraction component 310 to a voice print 30 associated with an enrolled user whose identity is being asserted. When multiple speaker recognition components 322 are employed, each may employ a different paradigm. In particular, voice print 30 may model the speech of an enrolled user using multiple modeling techniques. Thus, the particular feature vectors obtained by feature extraction component 310 and the specific comparisons made by the one or more speaker recognition components 322 may depend on the modeling techniques used to obtain voice print 30.

FIG. 3B illustrates an example where multiple speaker verification components are employed that use different paradigms. For example, the speaker verification components 322' include a Gaussian mixture model (GMM) 322a' and Neural Tree Network (NTN) 322b', which are known techniques for modeling the features of a voice signal. For example, GMM and NTN techniques are described in U.S. Pat. Nos. 5,839,103 ('103) and 6,519,561 ('561), both patents of which are incorporated herein by reference in their entireties. Each recognition component 322a',322b' may receive a different feature vector 315a',315b' that corresponds to the feature vectors used by the corresponding modeling technique. While the speaker verification systems in FIGS. 3A and 3B are shown as having multiple recognition components, a single recognition component may also be used, as the aspects of the invention are not limited in this respect.

Each speaker recognition component may compare the respective received feature vector with voice print 30 (e.g., the portion of the voice print formed using the respective modeling paradigm) to determine a similarity between the feature vector and the voice print. For example, each speaker recognition component may output a similarity value between "0" and "1", where "0" indicates an extreme of dissimilarity and "1" indicates an extreme of similarity. However, any measure(s) that indicates how well the received feature vector matches corresponding features in voice print 30 may be used, as the aspects of the invention are not limited in this respect.

Speaker verification 300 also may include score analysis component 330, which receives similarity measures output from the one or more speaker recognition components 322. Score analysis component 330 generates a similarity value 335 indicative of the likelihood that the voice signal 305 was uttered by the enrolled user and not a human impostor, and if multiple similarity values are generated, may combine the similarity measures to generate similarity value 335. Multiple similarity values may be combined in any way, such as a weighted average, selecting the maximum, minimum or medium similarity value, etc. As with the one or more similarity values output from the speaker recognition components, the combined similarity value may be any measure indicative of a match between the features extracted from the voice signal and the stored voice print for the enrolled user. If the similarity value 335 indicates a similarity greater than a predetermined threshold value, speaker verification 300 may determine that the voice signal 305 represents an utterance from the enrolled user whose voice is modeled by voice print 30.

Speaker verification 300' operates in a similar fashion as speaker verification 300. However, as discussed above, speaker verification 300' illustrates specific techniques used in producing recognition components 322a' and 322b'. As discussed above, any technique or method capable of comparing characteristic features extracted from a response voice signal with a stored voice print may be used, as the aspects of the invention are not limited in this respect. As discussed above, the verification system may include a single verification component. Alternately, the system may include additional verification components of any type. For example, the verification system may include a component using dynamic time warping (DTW) techniques, alone or in combination with components implementing other techniques. Any number of type of techniques may be used, as the aspects of the invention are not limited in this respect.

As discussed above in accordance with one embodiment, adaptation may be used to update a voice print based on changes in a verified speaker's voice to increase the accuracy of subsequent verification sessions. While adaptation typically is used to maintain accuracy from session to session (e.g., even as a speaker's voice ages), Applicant has appreciated that adaptation may also be used to improve verification accuracy within a single session. This may be done in any suitable way. For example, in one embodiment, the voice signal obtained from a speaker undergoing verification while speaking words that match the enrollment words may be matched with a stored voice print to verify the identity of the speaker. If successful, the characteristic features of the obtained voice signal may be incorporated into the voice print to compensate for voice aging, a change in handset, temporary voice changes due to a cold or allergies, etc. The updated voice print may then be used in one or more subsequent verification stages that use challenge words that differ from the enrollment words. In this respect, Applicant has discovered that it is more difficult to obtain high accuracy when using challenge words that differ from the enrollment words, and that adjusting the voice print in session based on the speaker's voice while speaking the earlier portion of the challenge utterances (e.g., those that match the enrollment vocabulary) can increase verification accuracy. However, this is merely one use of the aspect of the invention that relates to in session adaptation, as others are possible.

It should be appreciated that the adaptation may be performed only after a first stage verifies the identity of the speaker, as it is not desirable to adapt the model based upon input from other speakers.

The specific parameters that are updated and/or modified during adaptation may depend on the modeling techniques used to develop the voice print being adapted. For example, the parameters that are updated may depend on the parameters that characterize a specific voice print and modeling techniques used to create it. With respect to the techniques described in connection with FIG. 3B, adaptation may include adapting the parameters of the GMM model and/or the NTN model to incorporate updated voice information from a verified speaker. The 561' patent incorporated above describes methods of adapting a voice print using GMM and NTN modeling techniques that may be employed. However, it should be appreciated that any method that updates the parameters of a voice print based on voice information obtained at one or more times subsequent to enrollment may be used, as the aspects of the invention are not limited in this respect.

Figure 4:
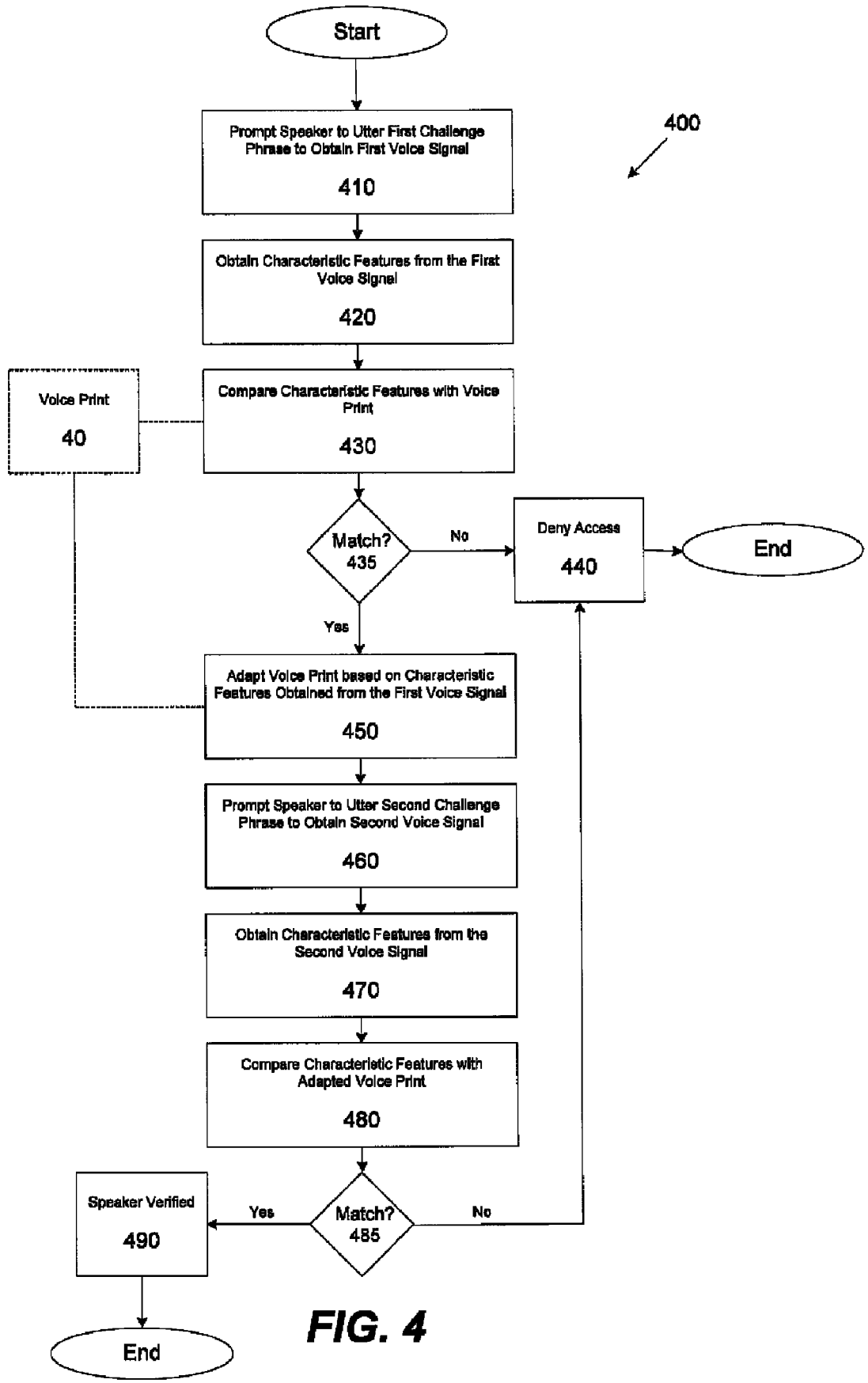
FIG. 4 is a flow chart illustrating a method of employing adaptation in a single verification session, in accordance with some embodiments of the present invention.

FIG. 4 illustrates an illustrative method of employing adaptation in a single verification session, in accordance with some embodiments of the present invention. This is merely an example, as the aspect of the invention relating to in session adaptation is not limited to this specific method.

In act 410, a speaker undergoing verification may be prompted to utter a first challenge utterance to obtain a first voice signal of the speaker. The first challenge utterance may be one or more words selected from a challenge vocabulary. In one embodiment the challenge utterance may be selected from the same vocabulary as the enrollment utterance as using identical words increases the accuracy of the first stage verification pass which does not benefit from in session adaptation. However, the aspect of the invention that relates to in session adaptation is not limited in this respect, as the initial challenge words alternatively may, be selected from a different vocabulary. Characteristics features may then be extracted from the first voice signal (act 420). The obtained characteristic features may then be compared to a stored voice print 40 of an enrolled user whose identity the speaker is asserting (act 430). In act 435, the comparison results may be used to determine if the obtained characteristic features are similar enough to voice print 40 to conclude that there is a match. If the characteristic features in the obtained voice signal and those of the voice print are too dissimilar, the speaker is determined to be an imposter and access is denied (act 440). Otherwise, if the characteristic features are similar, the speaker may be allowed to proceed to the next stage in the multi-stage verification process.

In act 450, the characteristic features obtained from the first voice signal are used to adapt voice print 40. For example, the characteristic features may be incorporated into the one or more voice models that form the voice print to compensate for changes in the speaker's voice. That is, one or more parameters of the voice print may be updated based on the new voice information. In act 460, the speaker may be prompted to utter a second challenge utterance to obtain a second voice signal from the speaker. Characteristic features may then be obtained from the second voice signal (act 470) and compared with the adapted voice print (act 480) to determine if there is a match (485). If the comparison results indicate that it is likely the speaker is indeed the enrolled user, the speaker's identity may be verified (act 490). Otherwise, the speaker is denied access (act 440). Because the adapted voice print is used contemporaneously in the same session, the adapted voice print may be capable for compensating for one or any combination of voice aging, cross-handset errors, temporary voice changes resulting from illness, etc.

As discussed above, conventional speaker verification systems select enrollment words and challenge words from the same vocabulary. A benefit of drawing words from the same vocabulary is that accuracy tends to be optimal when the same words or utterances that are used to develop the voice print are used to challenge a speaker undergoing verification. Using separate vocabularies (while increasing resistance to playback attacks) may negatively impact verification accuracy. While ensuring that a high-perplexity vocabulary has substantial phonetic overlap with enrollment utterance may minimize the decrease in accuracy, some degradation may still occur. Applicant has recognized that using multiple challenge stages including at least one challenge stage wherein the challenge words are drawn from the same vocabulary as the enrollment words and at least one challenge stage wherein the challenge words are drawn from a different vocabulary may be an effective way of achieving desired levels of accuracy in addition to securing against playback attacks.

Figure 5:
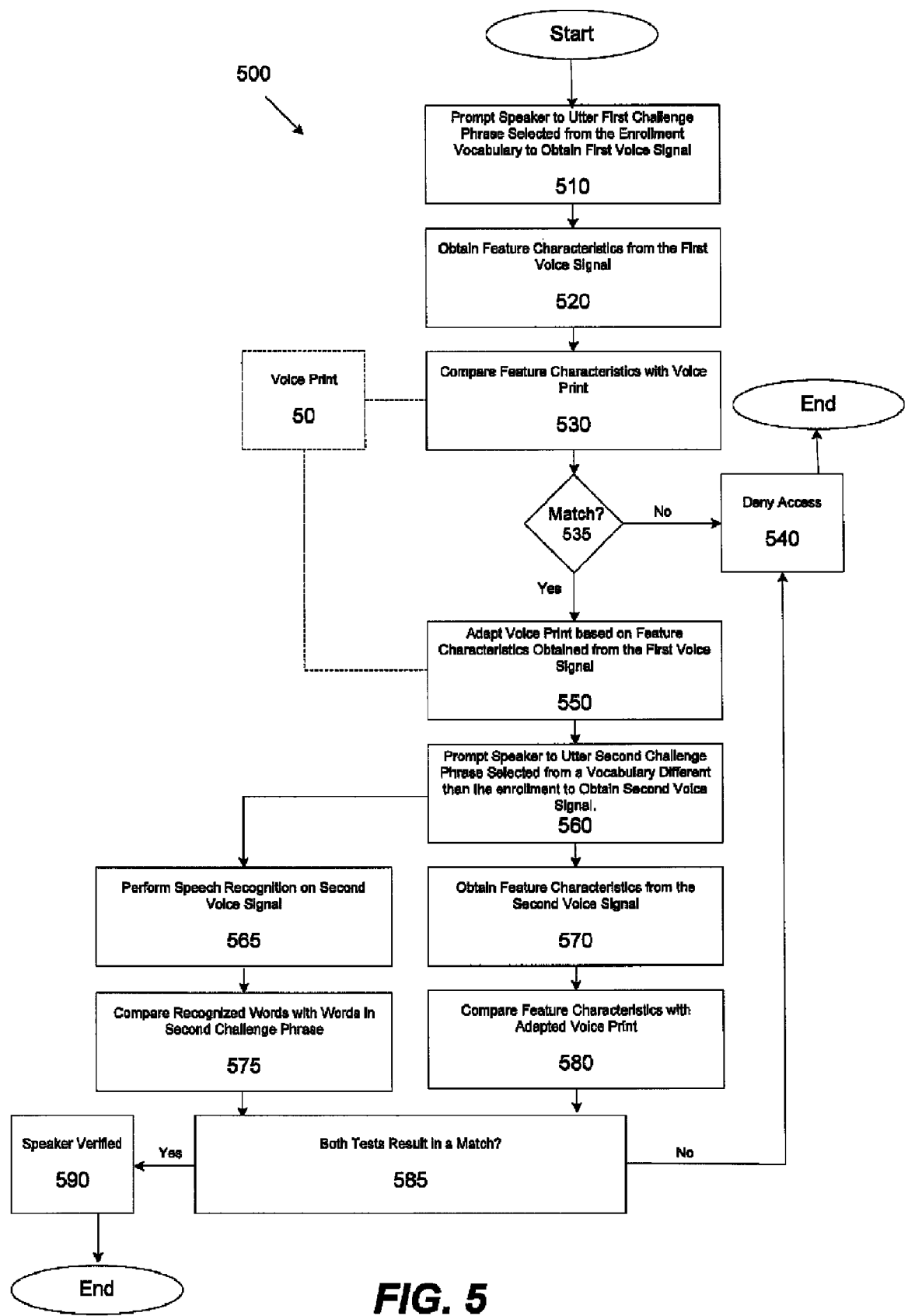
FIG. 5 is a flow chart illustrating a multi-stage verification method incorporating a stage directed to optimizing accuracy and a stage directed to preventing playback attacks, in accordance with some embodiments of the present invention.

In some embodiments, the aspects of the invention relating to doing in session adaptation and speech recognition along with voice verification are combined. FIG. 5 illustrates one example of a method for implementing such a system, but it should be appreciated that others are possible.

FIG. 5 illustrates a multi-stage verification method incorporating a stage directed optimizing accuracy and a stage directed to preventing playback attacks, in accordance with some embodiments of the present invention. Method 500 is similar to method 400 described above in that the verification process is comprised of two challenge/response stages. However, method 500 includes techniques that exploit the benefits of both conventional challenge/response schemes and challenge/response schemes using a high-perplexity vocabulary.

In act 510, a speaker undergoing verification may be prompted to utter a first challenge utterance selected from the same vocabulary of words used during enrollment. For example, if the user was prompted with the digits 1-9 during enrollment, the speaker may be prompted to utter a random sequence of digits, utter the exact same utterance used during enrollment, or utter any combination of digits. Alternatively, the user may have been prompted to utter a digit sequence specific to the user such as an account, telephone or social security number and the challenge utterance may include any number or combination of these same digits.

Because the first challenge utterance includes one or more words used during enrollment, the accuracy of the system is expected to be relatively high. In addition, because the multi-stage verification includes at least one later stage directed to preventing playback attacks, the first challenge/response stage (act 510) may be optimized for accuracy. For example, the speaker may be prompted to utter the same utterance used during enrollment (e.g., the user may be prompted to utter the digits 1-9 in the same order as prompted during enrollment) such that the obtained voice signals are most similar in content to voice signals obtained during enrollment to develop the voice print. However, as mentioned above, the speaker may be prompted to utter any challenge utterance selected, at least in part, from the enrollment vocabulary, as the aspects of the invention are not limited in this respect.

Characteristic features may then be extracted from the obtained voice signals (act 520) and compared with the stored voice print of the enrolled user whose identity the speaker is asserting (act 530) to determine if there is a match (act 535). A match refers to any satisfactory degree of similarity between the characteristics of the voice signal and the stored voice print. If a match is determined, the voice print may be adapted (act 550) based on the first voice signal obtained in act 510 to compensate for any one or combination of voice changes that may have occurred. In act 560, the speaker may be prompted to utter a second challenge utterance having at least one word that differs from words used during enrollment. For example, the speaker may be prompted to utter a second challenge utterance selected from a high-perplexity vocabulary having any of the features described herein to decrease the likelihood of a successful playback attack (e.g., including at least one word not in the enrollment vocabulary).

As discussed above, because the challenge utterance is selected from a high-perplexity vocabulary, it may be advantageous to perform speech recognition on the obtained voice signals to verify that the response utterance matches the actual words in the prompted challenge utterance (e.g., to prevent an imposter from replaying a term or terms that the imposter was able to record the user speaking but that differs from the challenge utterance (e.g., an imposter may replay a recording of "one-two-three" rather than a challenged utterance of "Evan-Lou-Lee"). In act 565, speech recognition is performed on the second voice signal to recognize the words uttered by the speaker. The recognized words may then be compared to the words comprising the second challenge utterance to ensure that the speaker responded with the same words that the speaker was prompted to utter (act 575). If there is a match (act 585), the speaker is confirmed to have uttered the correct response. Otherwise, the speaker may be denied access due to suspicion of a possible playback attack (act 540).

In the illustrative embodiment shown in FIG. 5, when it is determined that the speaker did not utter the correct utterance, access is denied in act 540 and the method ends. It should be appreciated that the manner in which the system responds to detecting a speaker who did not correctly speak the challenge utterance is not a limitation on any of the aspects of the present invention described herein. For example, in some embodiments, access may be entirely denied and the user seeking access to the system can be denied access entirely.

Alternatively, in accordance with other embodiments of the present invention, the user may be given one or more additional opportunities to correctly state a challenge utterance, which may be the same challenge utterance originally presented or, in accordance with some embodiments of the present invention, an alternative challenge utterance. In addition, when it is detected that a user has initially failed a first challenge utterance, techniques can be employed to make it increasingly difficult for a user to gain access to the system, for example, by requiring that a user correctly satisfy two or more challenge utterances. Once again, it should be appreciated that these are merely examples, as the manner in which the system responds when a user does not correctly state a challenge utterance is not a limitation of the aspects of the present invention described herein.

In act 570 characteristic features are obtained from the second voice signal, and in act 580, the obtained characteristic features are compared with the adapted voice print. If a match is found between the voice characteristics of the speaker and the enrolled user, and the utterance by the speaker is verified as being a correct response to the challenge utterance (act 585), the identify of the speaker may be verified and access granted (act 590). By initially using relatively high accuracy techniques (e.g., challenge words selected from the enrollment vocabulary), the system can verify that the speaker's voice is genuine and rule out all attacks other than a playback attack based on a recording of the user's voice. Once the genuineness of the user's voice is verified, features from it in the same session may be used to adapt the voice print, thereby enabling the system to achieve satisfactory accuracy for the next stage which uses relatively high security techniques (e.g., challenge words selected from a high-perplexity vocabulary) to guard against a playback attack.

Figure 6:
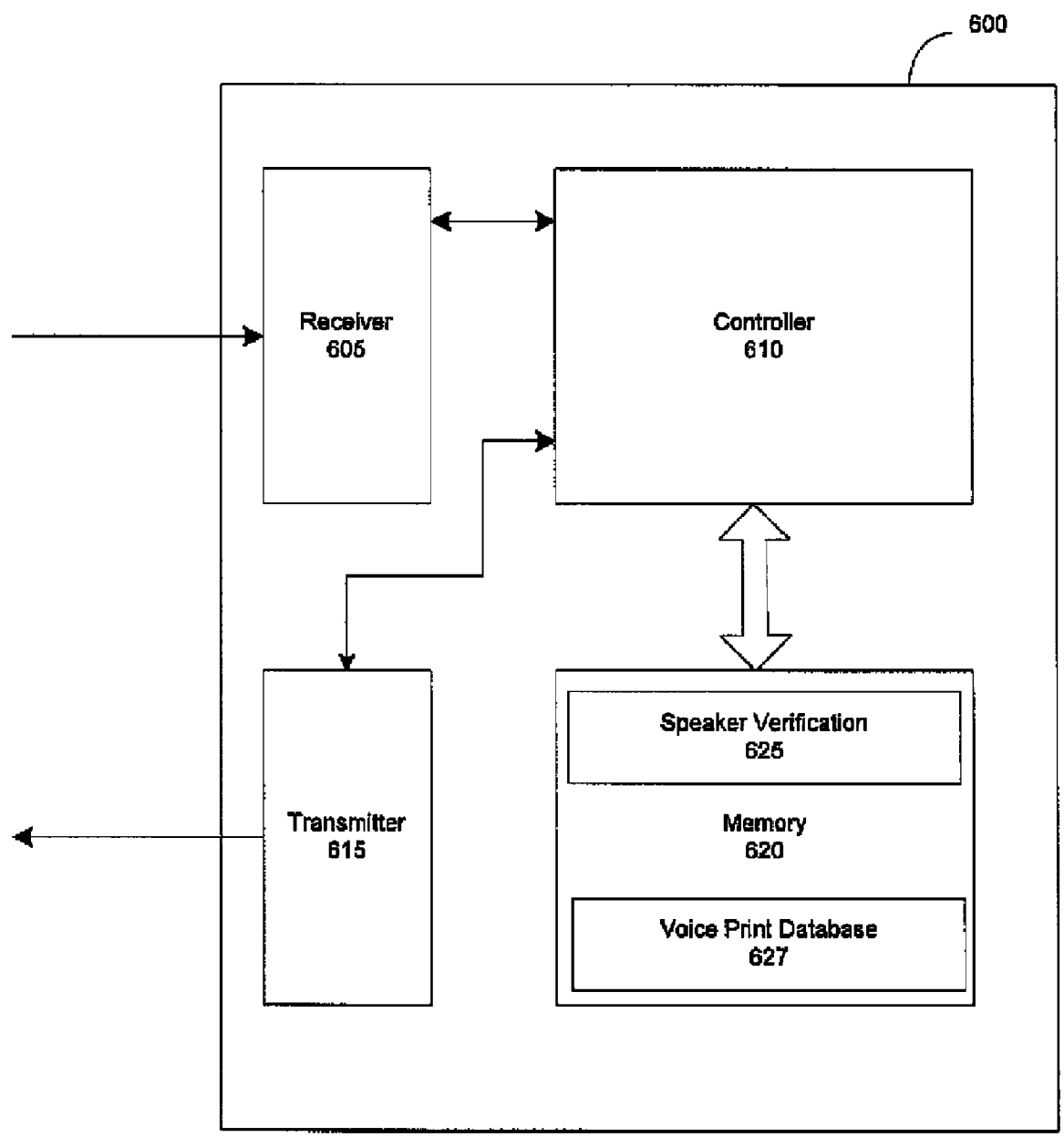
FIG. 6 illustrates a speaker verification system, in accordance with some embodiments of the present invention.

FIG. 6 illustrates a block diagram of a speaker verification system on which the embodiments of the present invention may be implemented. Speaker verification system 600 includes a receiver 605, a transmitter 615, a controller 610 and memory 620. Receiver 605 may be any component or combination of components capable of receiving voice signals from either a user enrolling with the speaker verification system 600 or a speaker undergoing verification. For example, when speaker verification system is part of an online or telephony system, receiver 605 may be an input connection capable of receiving signals over a network. If speaker verification system 600 is a stand alone unit, for example, providing access to secure locations in a building or other locale, receiver 605 may include a microphone to obtain and/or digitize a user/speaker's speech. Receiver 605 may include other components that convert voice signals received at the receiver into a format suitable for speaker verification.

Transmitter 615 may be any component or combination of components capable of transmitting prompts to a user enrolling and/or speaker undergoing verification to utter a desired enrollment utterance and/or challenge utterance. For example, when speaker verification system is part of an online or telephony system, transmitter 615 may be an output connection capable of transmitting signals over a network. If speaker verification system 600 is a stand alone unit, for example, providing access to secure locations in a building or other locale, transmitter 615 may include a speaker component capable of broadcasting the prompts, and/or alternatively a visual display that may present prompts textually. Transmitter 615 may include any suitable components that convert prompts into a format suitable for the medium over which it is being transmitted and/or presented to a user.

Verification system also includes controller 610 coupled to the transmitter 615, receiver 605 and memory 620. Controller 610 may include one or more processors for executing instructions stored in memory 620. In addition, controller 610 may include additional control units for providing information to be transmitted by transmitted 615 and receiving information obtained by receiver 605. The controller 610 may generally control various processes and computations performed by the system. Memory 620 may be any type of computer readable storage medium or storage device capable of storing data, instructions, etc., include RAM, disk storage and/or any other storage medium, examples of which are provided below Memory 620 may include a speaker verification program that, when executed by controller 610, performs any one or combination of methods described herein. Memory 620 may also store voice prints formed for the various users enrolled with the system in a voice database 627.

When speaker verification 625 is executed by the controller, the speaker verification may perform any of the methods described herein to facilitate verification resistant to playback attacks and/or verification with increased accuracy and/or security. The components of speaker verification 600 are merely exemplary. Any components suitable for achieving speaker verification may be used, as the aspects of the invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer readable storage medium (or multiple computer readable storage media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method for determining a validity of an identity asserted by a speaker using a voice print that models speech of a user whose identity the speaker is asserting, the method comprising acts of:
    performing a first verification stage comprising acts of:
        obtaining a first voice signal from the speaker uttering at least one first challenge utterance; and
        comparing at least one characteristic feature of the first voice signal with at least a portion of the voice print to assess whether the at least one characteristic feature of the first voice signal is similar enough to the at least a portion of the voice print to conclude that the first voice signal was obtained from an utterance by the user; and performing a second verification stage in a same session as the first verification stage if it is concluded in the first verification stage that the first voice signal was obtained from an utterance by the user, the second verification stage comprising acts of:

adapting at least one parameter of the voice print based, at least in part, on the first voice signal to obtain an adapted voice print;

obtaining a second voice signal from the speaker uttering at least one second challenge utterance; and comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user, wherein the second verification stage further comprises:

performing speech recognition on the second voice signal to recognize the words uttered by the speaker, and comparing the recognized words with the words in the second challenge utterance to assess whether the speaker uttered correct words corresponding to the second challenge utterance.

2. The method of claim 1, wherein the voice print is obtained from characteristic features of at least one voice signal obtained from the user uttering at least one enrollment utterance comprising at least one enrollment word, and wherein the at least one first challenge utterance comprises at least one word in the at least one enrollment utterance.

3. The method of claim 2, wherein the at least one first challenge utterance is comprised substantially of words in the at least one enrollment utterance.

4. The method of claim 2, wherein the at least one second challenge utterance includes at least one challenge word that was not in the at least one enrollment utterance.

5. The method of claim 4, wherein the at least one second challenge utterance is comprised substantially of words that were not in the at least one enrollment utterance.

6. The method of claim 5, wherein obtaining the first voice signal comprises prompting the speaker to utter the at least one first challenge utterance comprised substantially of words selected from an enrollment vocabulary comprising a plurality of enrollment words from which the at least one enrollment word was selected, and wherein obtaining the second voice signal comprises prompting the speaker to utter the at least one second challenge utterance comprised substantially of words from a challenge vocabulary comprising a plurality of challenge words.

7. The method of claim 6, wherein the enrollment vocabulary and the challenge vocabulary are comprised substantially of different words, and wherein the plurality of challenge words have phonetic overlap with the plurality of enrollment words.

8. The method of claim 7, wherein each of the plurality of challenge words has at least one syllable that rhymes with at least one syllable of at least one of the plurality of enrollment words.

9. The method of claim 4, wherein the at least one enrollment word was selected from an enrollment vocabulary comprising a plurality of enrollment words and the at least one second challenge utterance includes words selected from a challenge vocabulary comprising a plurality of challenge words, and wherein the challenge vocabulary includes more words than the enrollment vocabulary.

10. The method of claim 9, wherein at least one enrollment word in the enrollment vocabulary has at least two corresponding challenge words in the challenge vocabulary that are different and have phonetic overlap with the at least one enrollment word.

11. The method of claim 4, wherein the at least one second challenge utterance includes words selected from a challenge vocabulary comprising a plurality of challenge words, and wherein the challenge vocabulary includes at least 25 words from which the at least one challenge utterance may be formed.

12. The method of claim 11, wherein the challenge vocabulary includes at least 50 words from which the at least one challenge utterance may be formed.

13. The method of claim 1, wherein the voice print is not adapted if it is concluded in the first verification stage that the first voice signal was not obtained from an utterance by the user.

14. At least one computer-readable storage device storing at least one program for execution on at least one processor, the program having instructions that, when executed on the at least one processor, perform a method for determining a validity of an identity asserted by a speaker using a voice print that models speech of a user whose identity the speaker is asserting, the method comprising acts of:

performing a first verification stage comprising acts of:

obtaining a first voice signal from the speaker uttering at least one first challenge utterance; and comparing at least one characteristic feature of the first voice signal with at least a portion of the voice print to assess whether the at least one characteristic feature of the first voice signal is similar enough to the at least a portion of the voice print to conclude that the first voice signal was obtained from an utterance by the user; and performing a second verification stage in a same session as the first verification stage if it is concluded in the first verification stage that the first voice signal was obtained from an utterance by the user, the second verification stage comprising acts of:

adapting at least one parameter of the voice print based, at least in part, on the first voice signal to obtain an adapted voice print;

obtaining a second voice signal from the speaker uttering at least one second challenge utterance; and comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user, wherein the second verification stage further comprises:

performing speech recognition on the second voice signal to recognize the words uttered by the speaker, and comparing the recognized words with the words in the second challenge utterance to assess whether the speaker uttered correct words corresponding to the second challenge utterance.

15. The at least one computer-readable storage device of claim 14, wherein the voice print is obtained from characteristic features of at least one voice signal obtained from the user uttering at least one enrollment utterance comprising at least one enrollment word, and wherein the at least one first challenge utterance comprises at least one word in the at least one enrollment utterance.

16. The at least one computer-readable storage device of claim 15, wherein the at least one first challenge utterance is comprised substantially of words in the at least one enrollment utterance.

17. The at least one computer-readable storage device of claim 15, wherein the at least one second challenge utterance includes at least one challenge word that was not in the at least one enrollment utterance.

18. The at least one computer-readable storage device of claim 17, wherein the at least one second challenge utterance is comprised substantially of words that were not in the at least one enrollment utterance.

19. The at least one computer-readable storage device of claim 18, wherein obtaining the first voice signal comprises prompting the speaker to utter the at least one first challenge utterance comprised substantially of words selected from an enrollment vocabulary comprising a plurality of enrollment words from which the at least one enrollment word was selected, and wherein obtaining the second voice signal comprises prompting the speaker to utter the at least one second challenge utterance comprised substantially of words from a challenge vocabulary comprising a plurality of challenge words.

20. The at least one computer-readable storage device of claim 19, wherein the enrollment vocabulary and the challenge vocabulary are comprised substantially of different words, and wherein the plurality of challenge words have phonetic overlap with the plurality of enrollment words.

21. The at least one computer-readable storage device of claim 20, wherein each of the plurality of challenge words has at least one syllable that rhymes with at least one syllable of at least one of the plurality of enrollment words.

22. The at least one computer-readable storage device of claim 17, wherein the at least one enrollment word was selected from an enrollment vocabulary comprising a plurality of enrollment words and the at least one second challenge utterance includes words selected from a challenge vocabulary comprising a plurality of challenge words, and wherein the challenge vocabulary includes more words than the enrollment vocabulary.

23. The at least one computer-readable storage device of claim 22, wherein at least one enrollment word in the enrollment vocabulary has at least two corresponding challenge words in the challenge vocabulary that are different and have phonetic overlap with the at least one enrollment word.

24. The at least one computer-readable storage device of claim 17, wherein the at least one second challenge utterance includes words selected from a challenge vocabulary comprising a plurality of challenge words, and wherein the challenge vocabulary includes at least 25 words from which the at least one challenge utterance may be formed.

25. The at least one computer-readable storage device of claim 24, wherein the challenge vocabulary includes at least 50 words from which the at least one challenge utterance may be formed.

26. The at least one computer-readable storage device of claim 14, wherein the voice print is not adapted if it is concluded in the first verification stage that the first voice signal was not obtained from an utterance by the user.

27. A speaker verification system comprising:
at least one computer readable storage medium storing at least one voice print, the at least one voice print obtained from characteristic features of at least one first voice signal obtained from a user uttering at least one enrollment utterance;
a receiver to receive voice signals of speakers being verified responding to prompts to utter one or more challenge utterances; and
at least one controller coupled to the at least one computer readable storage medium and the receiver, the at least one controller configured to perform a first verification stage comprising:
obtaining from the receiver a first voice signal from a speaker who is being verified, the first voice signal obtained from the speaker uttering at least one first challenge utterance; and
comparing at least one characteristic feature of the first voice signal with at least a portion of a first voice print of the at least one voice print obtained from the user whose identity the speaker is asserting to assess whether the at least one characteristic feature of the first voice signal is similar enough to the at least a portion of the first voice print to conclude that the first voice signal was obtained from an utterance by the user,
wherein the at least one controller is configured to perform a second verification stage in a same session as the first verification stage if it is concluded in the first verification stage that the first voice signal was obtained from an utterance by the user, the at least one controller, the second verification stage comprising:
adapting at least one parameter of the first voice print based, at least in part, on the first voice signal to obtain an adapted voice print;
obtaining from the receiver a second voice signal from the speaker uttering at least one second challenge utterance; and
comparing at least one characteristic feature of the second voice signal with at least a portion of the adapted voice print to assess whether the at least one characteristic feature of the second voice signal is similar enough to the at least a portion of the adapted voice print to conclude that the second voice signal was obtained from an utterance by the user,
wherein the second verification stage further comprises:
performing speech recognition on the second voice signal to recognize the words uttered by the speaker, and
comparing the recognized words with the words in the second challenge utterance to assess whether the speaker uttered correct words corresponding to the second challenge utterance.

28. The speaker verification system of claim 27, wherein each at least one voice print is obtained from characteristic features of at least one voice signal obtained from the user uttering at least one enrollment utterance comprising at least one enrollment word, and wherein the at least one first challenge utterance comprises at least one word in the at least one enrollment utterance.

29. The speaker verification system of claim 28, wherein the at least one first challenge utterance is comprised substantially of words in the at least one enrollment utterance.

30. The speaker verification system of claim 28, wherein the at least one second challenge utterance includes at least one challenge word that was not in the at least one enrollment utterance.

31. The speaker verification system of claim 30, wherein the at least one second challenge utterance is comprised substantially of words that were not in the at least one enrollment utterance.

32. The speaker verification system of claim 31, further comprising a transmitter to transmit prompts to speakers interacting with the speaker verification system, and wherein the first voice signal is obtained by prompting, via the transmitter, the speaker to utter the at least one first challenge utterance comprised of words selected from an enrollment vocabulary comprising a plurality of enrollment words from which the at least one enrollment word was selected, and wherein the second voice signal is obtained by prompting, via the transmitter, the speaker to utter the at least one second challenge utterance comprised of words from a challenge vocabulary comprising a plurality of challenge words.

33. The speaker verification system of claim 32, wherein the enrollment vocabulary and the challenge vocabulary comprised substantially of different words, and wherein the plurality of challenge words have phonetic overlap with the plurality of enrollment words.

34. The speaker verification system of claim 33, wherein each of the plurality of challenge words has at least one syllable that rhymes with at least one syllable of at least one of the plurality of enrollment words.

35. The speaker verification system of claim 30, wherein the at least one second challenge utterance includes words selected from a challenge vocabulary comprising a plurality of challenge words, and wherein the challenge vocabulary includes more words than the enrollment vocabulary.

36. The speaker verification system of claim 35, wherein at least one enrollment word in the enrollment vocabulary has at least two corresponding challenge words in the challenge vocabulary that are different and have phonetic overlap with the at least one enrollment word.

37. The speaker verification system of claim 30, wherein the at least one second challenge utterance includes words selected from a challenge vocabulary comprising a plurality of challenge words, and wherein the challenge vocabulary includes at least 25 words from which the at least one challenge utterance may be formed.

38. The speaker verification system of claim 37, wherein the challenge vocabulary includes at least 50 words from which the at least one challenge utterance may be formed.

39. The speaker verification system of claim 27, wherein the at least one controller does not adapt the at least one voice print if it is concluded in the first verification stage that the first voice signal was not obtained from an utterance by the user.

* * * * *